July 1, 1924.

C. LE G. FORTESCUE 1,499,359

COMBINED FREQUENCY CHANGER AND PHASE CONVERTER

Original Filed Sept. 16, 1918    3 Sheets-Sheet 1

WITNESSES:

INVENTOR
Charles LeG. Fortescue.
BY
ATTORNEY

Patented July 1, 1924.

1,499,359

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

COMBINED FREQUENCY CHANGER AND PHASE CONVERTER.

Application filed September 16, 1918, Serial No. 254,313. Renewed November 19, 1923.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Combined Frequency Changers and Phase Converters, of which the following is a specification.

My invention relates to converting systems of the character wherein polyphase currents are derived from a single-phase source, and it has for its object to provide a system of the character designated that shall permit the derivation of polyphase currents of widely different working frequencies from a given single-phase source, together with means whereby, at no time, is the polyphase load circuit caused to be unbalanced by reason of the ohmic and inductive drops existing within the apparatus.

Figure 1:
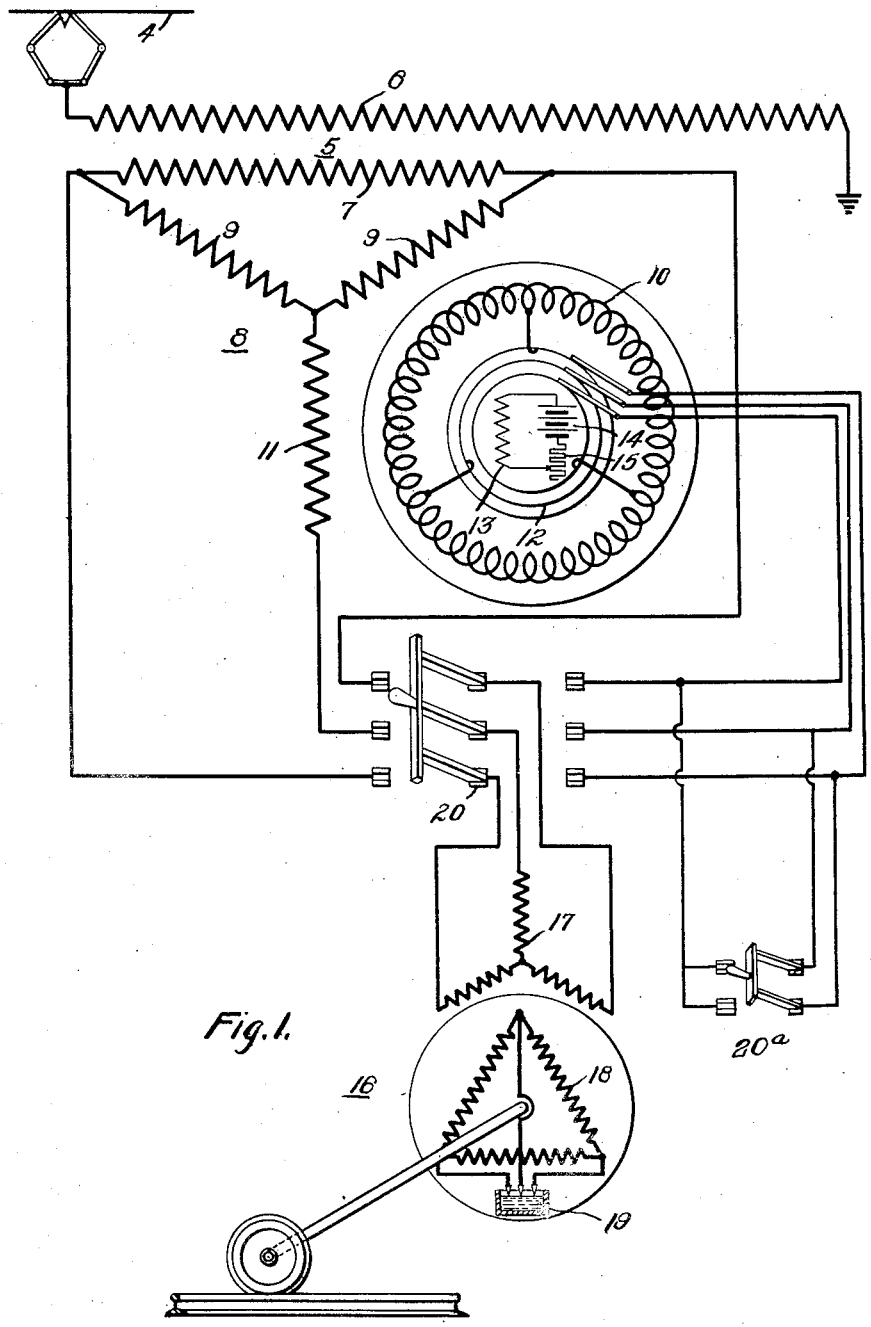
Figure 2:
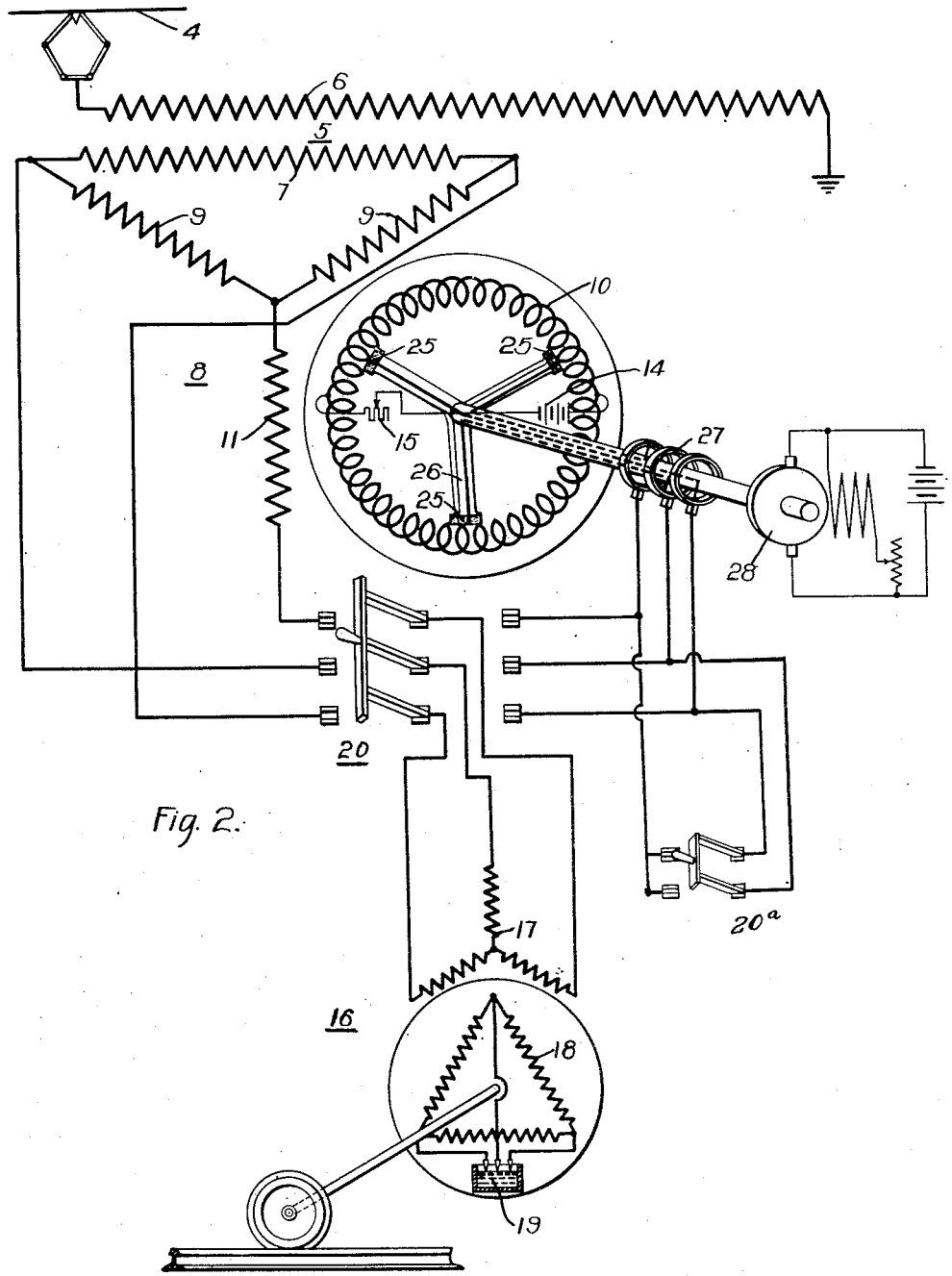
Figure 3:
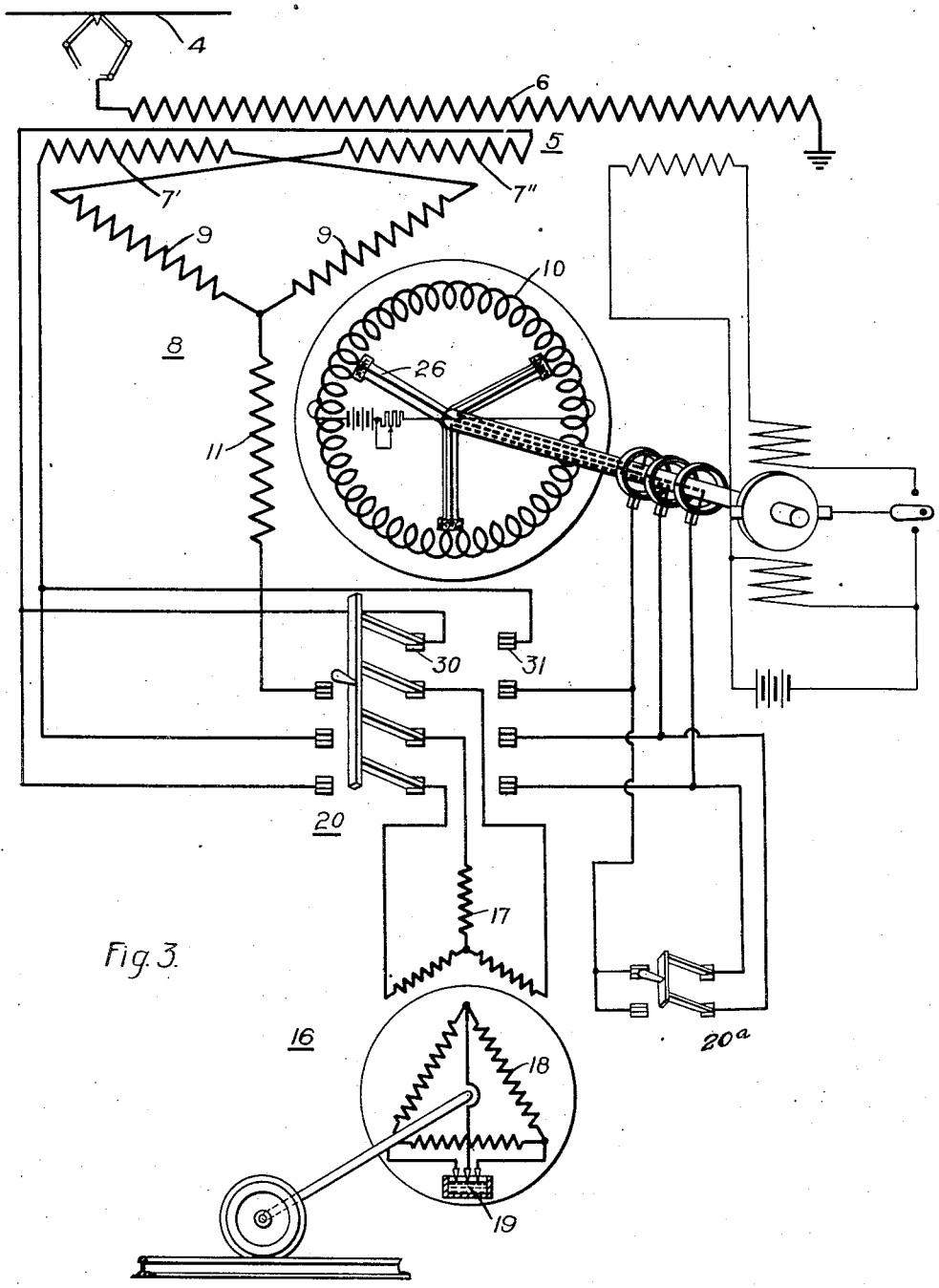

In the accompanying drawing, Fig. 1 is a diagrammatic view of a phase converter of the dynamo-electric type, together with associated supply and load circuits and attendant auxiliary apparatus, embodying a preferred form of my invention; and Figs. 2 and 3 are views similar to Fig. 1 and embodying modifications in the circuits thereof.

It is well known that any alternating function may be resolved into two oppositely rotating components and that, accordingly, the single-phase primary field of a phase converter of the usual dynamo-electric type may be resolved into forwardly and backwardly rotating component fields in its effect upon the secondary member. As a result, in a phase-converter operating slightly under synchronous speed, there is a forwardly rotating component of polyphase currents in the secondary winding thereof having slip frequency and, furthermore, a polyphase component of secondary currents having double frequency minus slip and having a negative phase sequence with respect to the direction of rotation.

If unidirectional excitation be applied to the converter secondary member, whereby synchronous speed thereof is obtained, the voltage and frequency of said forwardly rotating polyphase component disappear entirely and the only currents left in the secondary winding are those of double the frequency of the source and of negative phase sequence.

I find that, by employing a converter having a secondary winding of the closed type and by the use of suitable contact-making devices, these double-frequency currents may be supplied to an external load circuit for the production of useful work therein.

Not only am I thus enabled to alter both the phase number and the frequency of the primary supply currents but, by virtue of the fact that the phase sequence of the secondary currents thus employed is the same as the phase sequence of the secondary ohmic and reactive drops, it follows that varying degrees of load do not tend to produce unbalance within the polyphase load circuit, as is the case where use is made of the forwardly rotating secondary currents.

By employing a converting system of the character described and claimed in my copending application, Serial No. 206,932, filed Dec. 13, 1917, and in a copending application of Lewis W. Chubb, Serial No. 206,921, filed Dec. 13, 1917, and assigned to the Westinghouse Electric & Manufacturing Company, I am enabled to obtain polyphase load currents of the frequency of the supply without unbalance due to load, this effect being produced by employing the secondary electromotive forces of the supply transformer to reverse the phase sequence of the output electromotive forces of the converter. By combining with a system of this general character means for deriving double-frequency secondary currents for supply to the load circuit, I am enable to obtain balanced polyphase currents of either the frequency of the source or of twice said frequency, under all conditions of load.

If desired, I may derive the desired double-frequency currents from the secondary winding through a commutator and I may further provide means for adjusting the relative speed of the commutator segment and the brushes independently of the speed of rotation of the converter secondary member and, in this way, I am enabled to obtain any desired frequency of currents from the secondary members of the converter, these currents being balanced under all load conditions because of the fact that their phase sequence is the same as is that of the ohmic and inductive drops.

Referring to the drawing for a more detailed understanding of my invention, I show a source of alternating current at 4 in Fig. 1, such, for example, as the trolley conductor of an alternating current railroad. A transformer 5 comprises a primary winding 6 and secondary winding 7, the primary winding 6 being connected between the supply conductor 4 and the ground, as is usual in railway practice.

A phase-converter 8 of the dynamo-electric type is employed for converting single-phase energy derived from the source 4 into polyphase energy and comprises primary windings 9—9, a secondary winding 10 and a tertiary winding 11, the primary and tertiary windings being indicated as mounted upon the stator, whereas the secondary winding is mounted upon the rotor member.

The secondary winding 10 is shown as of the closed distributed type and is tapped at points separated by 120 electrical degrees for connection to suitable slip rings 12—12.

Unidirectional excitation may be supplied to the rotor member of the converter, as by a winding 13 energized from a direct-current source 14, this energization being subject to control, as by a rheostat 15.

Polyphase energy derived from the converting system may be employed to drive a propulsion motor 16 of the polyphase induction type, shown as embodying a star-connected primary stator winding 17 and a delta-connected rotor secondary winding 18 suitably associated with a control rheostat 19.

The motor 16 may be connected to the terminals of the transformer secondary winding 7 and to the terminal of the tertiary winding 11 by any suitable switching mechanism, indicated by a double-throw switch 20 which produces this connection when thrown to its left-hand position. In like manner, the motor 16 may be connected to the slip rings 12—12 by throwing the switch 20 to its right-hand position.

Having thus described the arrangement of a system embodying my invention, the operation is as follows: At the outset, it is desirable that relatively low-frequency currents be supplied to the motor 16 and, to this end, the switch 20 is thrown to its left-hand position, whereupon the converter 8 operates as the usual phase converter, the secondary winding 10 functioning to generate an electromotive force in the tertiary winding 11 in quadrature to the electromotive force of the source, and polyphase currents of the frequency of the source being supplied to the primary member 17 of the motor 16. In order to enable the secondary winding 10 to function as just stated, it is, of course, understood that the secondary winding will have to be short circuited, as by means of a short-circuiting switch 20a, to produce a damper-winding effect during said operation. At the outset, a large amount of resistance is inserted in circuit at the rheostat 19 and, for acceleration, this resistance is decreased until substantially synchronous speed, with respect to the applied frequency, is secured in the motor 16.

If it now be desired to accelerate the motor 16 to still higher speeds, the switches 20 and 20a are thrown to the right-hand position so that energy for the motor 16 is derived directly from the converter secondary winding 10 through the slip rings 12—12 and the associated taps. The currents thus supplied are of double-frequency for the following reasons. The single-phase alternating field set up by the converter primary winding 9—9 may be considered as the equivalent of two equal and oppositely rotating polyphase magnetic fields operating upon the secondary member, each having one-half the maximum amplitude of the alternating field. The fact that the converter rotor is driven at synchronous speed by the unidirectional winding 13 renders it impossible for the armature conductors to cut the forwardly rotating component of the primary exciting field and, therefore, no currents are generated in the armature or rotor winding by this component. The armature conductors cut the backwardly rotating component of the exciting field at such a rate as to generate double-frequency currents therein and these currents are supplied to the motor stator winding 17 as before. At the instant of throwing over the switch 20, the full amount of resistance of the rheostat 19 should again be reinserted in circuit, whereupon the motor 16 may be accelerated to substantially twice its former speed by the gradual elimination of resistance at this rheostat.

It would appear that the imposition of load upon the winding 10 would cause the rotor member of the converter to drop out of step and this would be so, were it not for the fact that the excitation of the winding 13 is gradually increased in accordance with the load so as to maintain the rotor in step.

It will be noted that the phase sequence of the ohmic and inductive drops within the secondary winding 10 is the same as the phase sequence of the double-frequency currents thus derived therefrom and, accordingly, these drops coalesce with the double-frequency electromotive forces to produce a balanced terminal voltage for the winding 10, under all conditions of load.

It thus being possible to secure balanced currents from the secondary winding 10, under all conditions of load, the power-factor of the system may be modified, as desired, by the adjustment of the rheostat 15 without in any way unbalancing the polyphase load circuit.

Referring to Fig. 2 of the drawing, the general arrangement of elements is as before except that energy is derived from the secondary winding 10 through a polyphase commutator rather than through slip rings and, furthermore, in that the unidirectional secondary field is produced directly within the winding 10 rather than in a separate winding, the source 14 being connected between points in the winding 10 having a relative electrical displacement of 180°.

The commutator for the derivation of the double-frequency currents from the winding 10 may take any desired form but, as shown, comprises brushes 25—25 mounted upon a rotatable spider 26 so as to have a relative phase displacement of substantially 120 electrical degrees and shown, for simplicity and clearness, as bearing directly upon the convolutions of the winding 10. The brushes 25—25 are connected through suitable slip rings 27 and the switch 20, as before. The spider 26 may be driven at any desired speed, as by an adjustable-speed motor 28.

In the operation of the system of Fig. 2, the initial acceleration with the switches 20 and 20a in the left-hand position is as before.

Having reached substantially synchronous speed in the motor 16, at the frequency of the source, the switches 20 and 20a are thrown to the right and the motor 28 is either permitted to remain at standstill or is caused to rotate forwardly at very low speed. The reversely-rotating component of the converter field is rotating backwardly at synchronous speed and thus serves to produce currents of substantially line frequency at the brushes 25—25 for supply to the motor 16.

The motor 28 is now gradually speeded up so that the relative speed difference between the brushes 25—25 and the reversely rotating converter secondary field becomes greater and greater, whereupon the frequency of the currents supplied to the motor 17 gradually increases with the attendant acceleration of the motor, it being noted that this acceleration is produced without marked heating losses at the rheostat 19.

If desired, the switch 20 may be maintained in its right-hand position throughout the entire accelerating operation. Under these conditions, at the outset of operation, the brushes 25—25 are caused to rotate in the opposite direction from the converter rotor and at the speed thereof, whereupon the currents derived from the winding 10 are of extremely low frequency. Gradual slowing down of the brushes 25—25 produces an increase in this frequency until supply frequency is secured, whereupon acceleration in the opposite direction increases the output frequency until the desired double-frequency currents are secured.

Referring to Fig. 3 of the drawing, the general arrangement of elements is as before except that the secondary member of the transformer is divided into two equal parts 7' and 7" and these secondary windings are inserted between the primary windings 9—9 of the converter and the motor 16 in such manner that their electromotive forces reverse the phase sequence of the output electromotive forces of the converter during normal operation, as explained in detail in the aforementioned Chubb application. As a result, when the switches 20 and 20a are thrown to the left-hand position, the polyphase electromotive forces supplied to the motor 16 have the same phase sequence as the ohmic and inductive drops within the converter and, hence, no unbalancing of the polyphase circuit occurs, irrespective of the load.

The secondary member of the converter 8 is arranged as in the system of Fig. 2, and operation during the derivation of double-frequency currents is as described in detail in connection with said system, the only additional element being that the switch 20 is provided with two auxiliary contact members 30—31 adapted to be connected when the switch 20 is in its right-hand position so that a current path is provided through the transformer winding 7' and 7".

While I have illustrated and described a plurality of modifications of my invention, it will be understood by those skilled in the art that it is not so limited but is capable of still further modifications and arrangement without departing from the spirit thereof, and I desire, therefore, that only such limitations shall be imposed thereon as are imposed by the prior art or are specifically set forth in the appended claims.

I claim as my invention:

1. The combination with a dynamo-electric machine of the alternating-current type embodying a forwardly rotating substantially constant-speed rotor member having a winding in which polyphase currents having a backwardly rotating phase sequence tend to flow, of means for deriving currents of varying frequencies from said rotor member.

2. The combination with a source of single-phase, alternating-current, of a substantially constant-speed dynamo-electric machine of the induction type having its primary winding connected to said source and having relative motion between its primary and secondary members of substantially synchronous speed, whereby currents of slip-frequency and forward phase-sequence and currents of substantially twice the frequency of said source and backward phase sequence tend to flow in the secondary winding of said machine, of a load circuit and means for supplying currents of varying frequencies from said secondary winding to said load circuit.

3. The combination with a substantially constant-speed dynamo-electric machine of the induction type embodying primary and secondary windings, of means for supplying single-phase alternating current to the primary winding, whereby relative motion, at substantially synchronous speed, is produced between the primary and secondary windings and polyphase currents having negative phase-sequence with respect to the direction of rotation tend to flow in said secondary winding, of a polyphase load circuit, means for supplying currents of varying frequencies from said secondary winding to said load circuit, and means for supplying unidirectional excitation to the secondary of said machine in varying amounts, whereby the power factor of the alternating-current source may be modified without unbalancing said polyphase load circuit.

4. The combination with a dynamo-electric machine of the induction type embodying a primary winding and a secondary member provided with a closed winding connected to a commutator having polyphase brushes, of means for supplying single-phase alternating current to said primary winding to produce relative motion, at substantially synchronous speed, between said primary and secondary members, whereby currents of slip-frequency and forward phase-sequence and currents of substantially twice the frequency of said source and backward phase sequence tend to flow in the secondary winding of said machine, a polyphase load circuit connected to said brushes, whereby polyphase currents are supplied to said polyphase circuit, and means for producing any desired relative speed between the brushes and segments of said commutator, independent of the speed of rotation of said alternating-current machine, whereby the frequency of said polyphase currents may be modified.

5. The combination with a dynamo-electric machine of the induction type embodying a primary winding and a secondary member provided with a closed winding connected to a commutator having polyphase brushes, of means for supplying single-phase alternating current to said primary winding to produce relative motion at substantially synchronous speed between said primary and secondary members, whereby currents of slip-frequency and forward phase-sequence and currents of substantially twice the frequency of said source and backward phase sequence tend to flow in the secondary winding of said machine, a polyphase load circuit connected to said brushes, whereby polyphase currents are supplied to said polyphase circuit, means for producing any desired relative speed between the brushes and segments of said commutator, independent of the speed of rotation of said alternating-current machine, whereby the frequency of said polyphase currents may be modified, and means for producing a variable unidirectional excitation in the secondary member of said alternating-current machine, whereby the power-factor of said alternating-current source may be modified without unbalancing said polyphase load circuits.

6. The combination with a source of single-phase alternating current, of a phase converter of the dynamo-electric type embodying primary, secondary and tertiary windings, said primary winding being connected to said source and said secondary winding being of the closed type and connected to a commutator, a polyphase load circuit, means for, at times, energizing said load circuit from said source of said tertiary windings, whereby it is energized with polyphase currents of the frequency of said source, means for, at other times, energizing said load circuit, through said commutator, from the polyphase electromotive forces of double the frequency of said source and of backward phase sequence existing in the secondary winding of said converter, and means for independently adjusting the relative speed of brushes and commutating segments in said commutator, whereby the frequency of said last-named polyphase currents may be varied.

In testimony whereof, I have hereunto subscribed my name this 31st day of Aug. 1918.

CHARLES LE G. FORTESCUE.